United States Patent [19]

Suzuki et al.

[11] 4,435,885
[45] Mar. 13, 1984

[54] PROCESS AND APPARATUS FOR MANUFACTURING STORAGE BATTERY PLATES

[75] Inventors: Yuichi Suzuki; Ichiro Sano, both of Yokohama, Japan

[73] Assignees: Furukawa Denchi Kabushiki Kaisha; Furukawa Denki Kogyo Kabushiki Kaisha, both of Tokyo, Japan

[21] Appl. No.: 524,471

[22] Filed: Aug. 19, 1983

Related U.S. Application Data

[63] Continuation of Ser. No. 239,883, Mar. 2, 1981, abandoned.

[30] Foreign Application Priority Data

Feb. 28, 1980 [JP] Japan ................................ 55-23436

[51] Int. Cl.³ ...................... B23P 19/00; B23P 25/00; B26D 7/00; B26D 7/06
[52] U.S. Cl. .............................................. 29/2; 83/108
[58] Field of Search ........................... 29/2, 417, 623.5; 72/330, 337, 338, 339; 83/25, 108

[56] References Cited

U.S. PATENT DOCUMENTS

| 3,095,633 | 7/1963 | Shannon | 29/2 |
| 3,580,122 | 5/1971 | Powell | 83/108 |
| 3,621,543 | 11/1971 | Willmann et al. | 29/2 |
| 3,916,515 | 11/1975 | Walsh et al. | 83/108 |
| 3,989,539 | 11/1976 | Grabb | 29/2 |
| 4,016,633 | 4/1977 | Smith et al. | 29/2 |

FOREIGN PATENT DOCUMENTS

| 2500138 | 8/1976 | Fed. Rep. of Germany | 72/339 |
| 55-30114 | 3/1980 | Japan | 29/623.5 |
| 913959 | 12/1962 | United Kingdom | 83/108 |

*Primary Examiner*—E. R. Kazenske
*Assistant Examiner*—Paul M. Heyrana
*Attorney, Agent, or Firm*—Armstrong, Nikaido, Marmelstein & Kubovcik

[57] ABSTRACT

A process and apparatus for the manufacture of plates of an electrical storage battery involves the partial or total severing of a plate blank from a strip of stock material and the subsequent filling of a grid of the plate blank with a material in paste form prior to the removal of the filled plate from the stock material.

8 Claims, 14 Drawing Figures

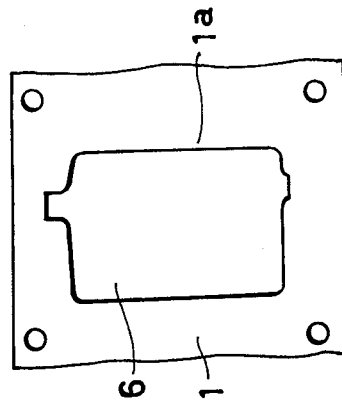
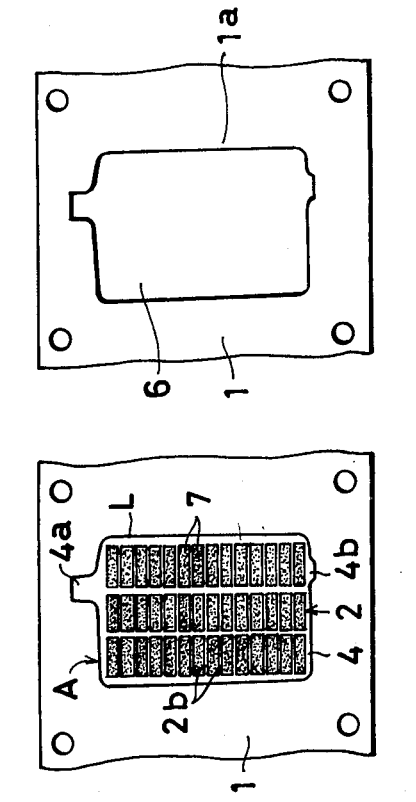
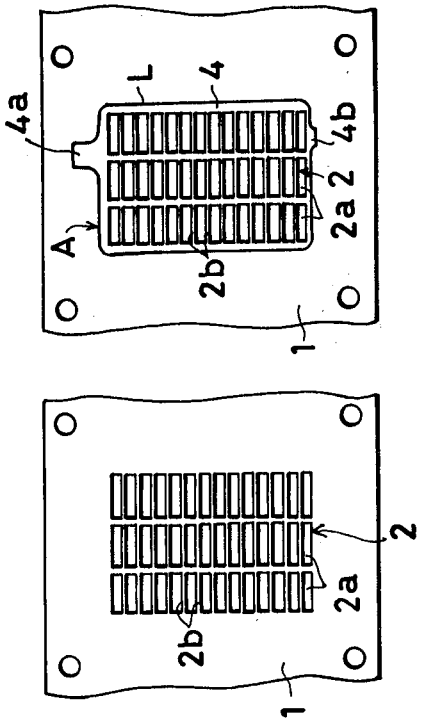
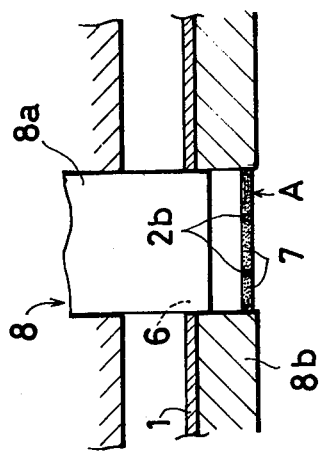
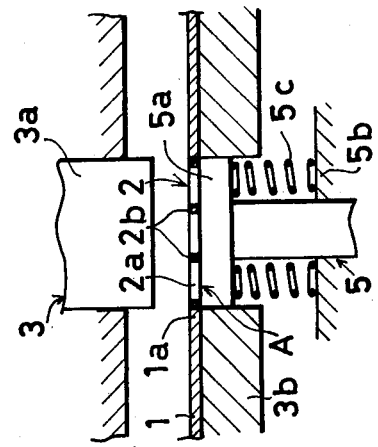
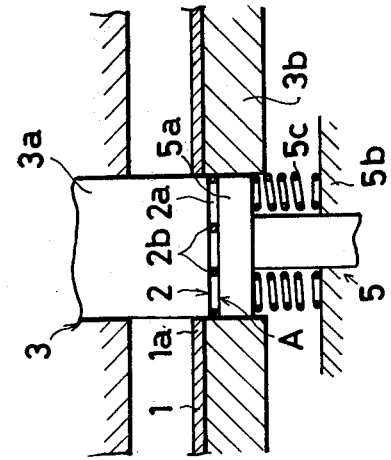

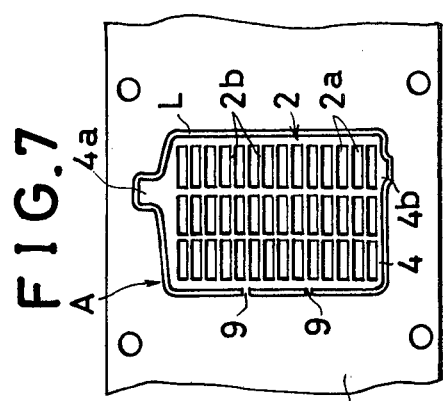
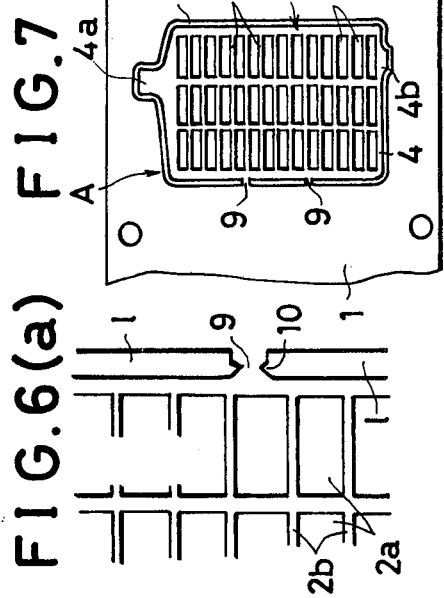
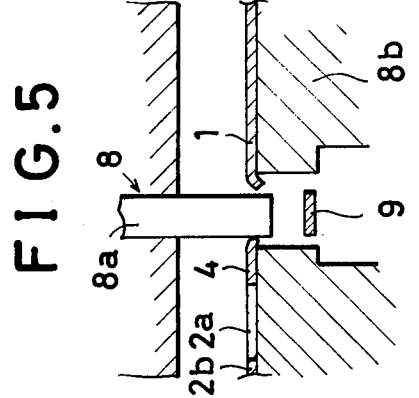
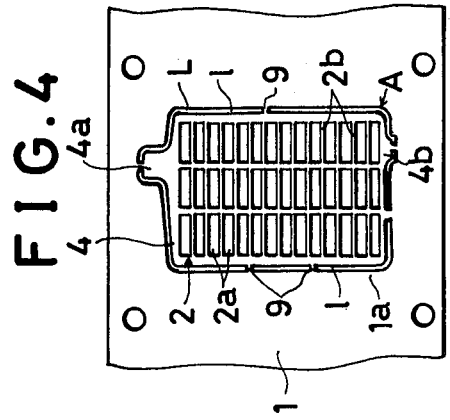
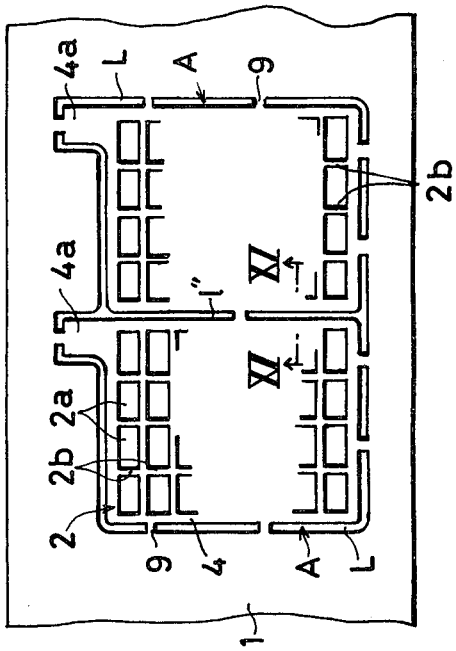
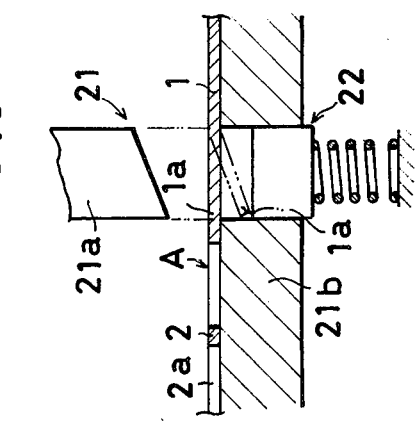
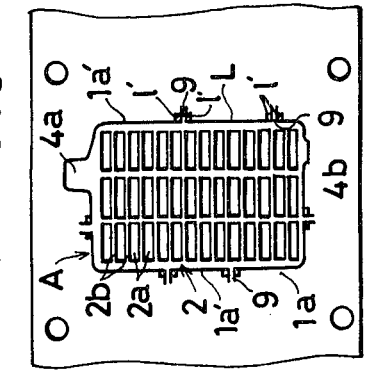

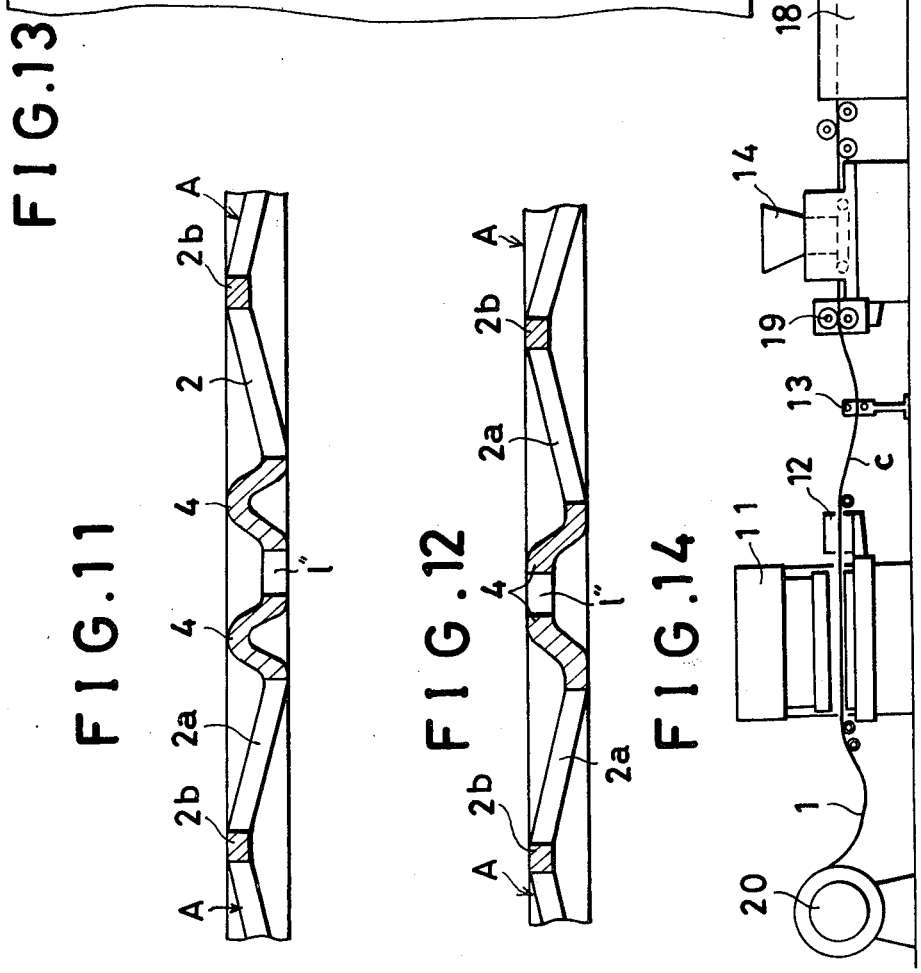

PROCESS AND APPARATUS FOR MANUFACTURING STORAGE BATTERY PLATES

This application is a continuation, of application Ser. No. 239,883, filed Mar. 2, 1981 now abandoned.

FIELD OF THE INVENTION

This invention relates to the manufacture of plates for a lead/acid electrical storage battery of the type comprised by a plate blank in the form of a grid, the openings of which are filled with a material in paste form during the manufacture of the plates.

BACKGROUND OF THE INVENTION

A known technique of manufacturing battery plates involves the punching of a grid of openings in a strip of lead sheeting, and the filling of the grid openings with a material in paste form prior to the cutting or punching of the plate out of the strip.

This technique is encumbered with several disadvantages which can seriously affect the quality of the finished plates, and which additionally can severely curtail the useful life of the cutting dies or punches required in the cutting or punching of the plates out of the strip.

In particular, the paste which is filled into the grid openings is a highly corrosive material comprised of lead powder, lead oxide, lead sulfate and water, which, when filled into the openings spreads over the surrounding area of the lead strip, and, during the subsequent die cutting or punching operation to remove the filled plate from the lead strip, contaminates the cutting die or punch and results in the rapid corrosion thereof.

As cutting dies or punches formed from high-speed steel or die steel are readily susceptible to corrosion by the paste, it has been found necessary to resort to cutting dies or punches formed from a corrosion resistant material, such as a cobalt alloy.

While the use of this expensive alloy extends the useful life of the cutting die or punch, it still is not entirely satisfactory, in that corrosion of the cutting die or punch still proceeds, but at a lower rate, and results in the ultimate destruction of the die or punch in an extended but still a relatively short time.

In an attempt to further extend the useful life of the cutting die or punch, resort has been made to the coating of the die or punch with a ceramic material. Such materials are, however, inherently brittle and friable, and upon wear of the coating expose the metal substrate to the corrosive paste, this resulting in etching of the substrate and the rapid breakdown of the then unsupported ceramic coating.

Additional problems which arise in this manufacturing technique are that of distortion or deformation of the filled plate as it is struck out of the stock strip material, and, the displacement or falling out of the paste material under the impact shock of the punching operation, both of which militate against the continuous production of uniformly high quality plates of close manufacturing tolerances, and result in an increase in the number of rejects in a production run.

In an attempt to avoid these problems, it has been prior proposed to punch the entire plate blank and remove it from the stock strip material prior to the filling of the grid openings with the paste material. Such an operation, however, carries with it the disadvantages that additional machinery is required in the handling of the individual plates, and a high production rate cannot readily be achieved.

OBJECT OF THE INVENTION

It is an object of this invention to eliminate the disadvantages described above, and to provide a process and an apparatus for the manufacture of filled battery plates in which the cutting die or punch employed for severing the plates from the strip stock material is not exposed to corrosion by the paste material, thus extending the useful life of the die or punch to that determined exclusively by normal wear on the die or punch, and also permitting the use of relatively inexpensive high-speed steel or die steel in the fabrication of the cutting die or punch.

INVENTIVE CONCEPT

According to the present invention, either simultaneously with the punching of the grid openings, or immediately subsequent thereto and prior to the filling of the openings with the corrosive paste material, the plate blank is either almost completely severed from the stock strip material for it to remain secured within the stock strip material by relatively weak and easily rupturable interconnecting bridges, or it is totally severed from the stock material in such a manner that it remains a press fit within the stock strip material and is movable in unison therewith.

In both instances, subsequent to the filling of the grid openings in the plate with the corrosive paste material, the filled plate can then be gently pushed out of the plane of the stock strip material without the application of a strong impact force. The ejector or pusher members can be formed of an inexpensive material such as high-speed steel or die steel, and be formed for them to be readily replaceable. Alternatively, the pusher members can be made of a corrosion impervious material such as polytetrofloroethylene, that material having adequate strength to break the relatively soft and ductile interconnecting bridges, or to overcome the force of the press fit of the plate within the stock strip material.

DESCRIPTION OF THE DRAWINGS

The invention will now be described with reference to the accompanying drawings, which illustrate preferred embodiments of the invention, and in which:

FIGS. 1a, 1b and 1c illustrate steps in the production of a battery plate, and FIG. 1d illustrates the stock strip material after removal of a finished plate;

FIGS. 2a and 2b are fragmentary cross-sectional views illustrating the punching of a plate blank from the stock strip material and the subsequent press fitting of the plate blank back into the aperture in the stock strip material for subsequent handling of the plate blank;

FIG. 3 is a fragmentary cross-sectional view through an ejector or pusher mechanism employed for removing a finished plate from its press-fitted association with the stock strip material.

FIG. 4 illustrates a plate blank formed in the stock strip material and which is held captive therein by interconnecting bridges;

FIG. 5 is a fragmentary sectional view through an ejector punch for breaking the relatively weak bridges;

FIGS. 6a and 6b illustrate alternative approaches to further weakening of the connecting bridges;

FIG. 7 illustrates a modification of the plate blank of FIG. 4;

FIG. 8 illustrates still another embodiment of plate blank according to the present invention;

FIG. 9 illustrates in cross-section a cutting die employed for severing the plate embodiment of FIG. 8;

FIG. 10 illustrates still another embodiment of the invention in which plural interconnected plate blanks are formed in the longitudinal direction of the stock strip material;

FIGS. 11 and 12 illustrate in cross-section the interconnected edges of a pair of plate blanks as shown in FIG. 10;

FIG. 13 illustrates an alternative embodiment of the invention in which plural interconnected plate blanks are formed in a direction transversely of the length of the stock strip material; and FIG. 14 illustrates schematically apparatus to be employed in the continuous production of finished plate blanks.

DESCRIPTION OF THE PREFERRED EMBODIMENTS

Referring now to the drawings, FIGS. 1A through 1C show sequentially the manner in which a filled plate blank is manufactured according to the present invention, the formation of the plate blank involving the punching of a strip of stock material 1 to form a grid 2 comprised by a plurality of openings 2a, 2a defined by vertical and horizontal grid members 2b, 2b.

Prior to the filling of the openings of the grid, the stock strip material is subjected to a second die cutting or punching operation, that operation involving, as illustrated in FIG. 1b and FIGS. 2a and 2b, the die cutting or punching of a plate blank A around the grid of openings 2 along a continuous line L to define a plate blank having a frame 4, a tab 4a and a leg 4b.

The die cutting or punching is effected by means of a second stage punch press 3 incorporating a male die member 3a which enters into a female die member 3b. Immediately beneath the stock strip material 1 is a movable platen 5, including a platen 5a which is mounted for vertical sliding movement in a base 5b, and which is biased by springs or other biasing members 5c to a position in which a top face of the platen is co-planar with the top face of the press bed.

Upon downward movement of the cutting die or punch 3a, a plate blank A is completely severed out of the stock strip material 1, and is moved bodily downwardly out of the plane of the plane of the stock strip material, the plate blank A being supported during this movement by the platen 5a. Upon retraction of the cutting die or punch 3a, the platen 5a returns to its initial position under the influence of the bias imposed on the platen, thus returning the plate blank a into the opening punched in the stock strip material 1, and, press fitting the plate blank a back into the opening. In this condition, the plate blank a is lightly held by the stock strip material 1, and is movable in unison therewith to a filling mechanism, in which the corrosive paste material is filled into the openings in the grid 2.

It is to be noted that the plate blank a is completely formed prior to the openings in the grid being filled with the said corrosive paste, at a time when the plate blank a is uncontaminated by the said corrosive paste. Thus, there is no possibility of the cutting die or punch becoming contaminated with the said corrosive paste, and, there is thus no opportunity for the cutting die or punch to become corroded.

By virtue of the fact that the cutting die or punch is in no way exposed to the corrosive paste, it can be formed of a relatively inexpensive material such as high-speed steel or die steel, both of which materials function in an entirely satisfactory manner in the absence of corrosion thereof.

Subsequent to the filling operation as illustrated in FIG. 1c, the stock strip material is fed to an ejector mechanism 8 which includes an ejector plunger 8a which is movable into an aperture 6 in a base plate 8b, the aperture being of complementary shape to the outline of the filled plate blank.

The ejector 8a is not required to perform any cutting operation on the stock strip material or on the filled plate, but merely acts to overcome the frictional restraint on removal of the filled plate from the stock strip material arising from the interference fit or press fit of the filled plate in the corresponding aperture in the stock strip material.

The stock strip material is a rolled strip of a lead alloy having a thickness in the range of 0.8 to 1.5 mm, the stock strip material being appropriately indexed between the station at which the grid openings are punched and the station at which the plate blank is punched. Conveniently, the strip may include edge perforations as shown which cooperate with positioning pins to ensure exact positioning of the openings of the grid 2 within the confines of the periphery of the plate blank A, and also to ensure correct positioning of the plate blank a relatively to the ejector 8a and the associated aperture 6 in the base plate 8b of the ejector mechanism.

As the ejector 8a is not required to perform any cutting operation, but merely acts to push the filled plate out of the plane of the stock strip material and downwardly through the opening 6, the ejector can be formed of any corrosion resistant metal, there being no requirement that the metal be a hard metal. Alternatively, the ejector can be formed from a plastics material such as polytetrofluoroethylene.

As the plate a can be separated from the stock strip material by a light pushing force, the filled plate is not subjected to an impact shock during the removal thereof from the stock strip material, and, as a consequence there is little probability of the paste filling the grid openings to be displaced or knocked out of the openings. Additionally, as the ejector engages the plate in substantially face engagement therewith, no forces are imposed on the plate which would tend to distort or deform it during its removal from the stock strip material, as illustrated in FIG. 1d.

Referring now to the alternative embodiments of FIG. 4, the line L is formed by a plurality of punched-out slots, the ends of which are spaced from the ends of adjacent slots in order to provide a plurality of bridges 9 which support the plate blank within the stock strip material during its transfer to the filling mechanism, and, during the filling of the openings with the corrosive paste in the filling mechanism. Subsequent to the filling of the openings, and as is illustrated in FIG. 5, the bridges 9 are ejected in an ejector mechanism 8 having an ejector 8a. As described with reference to FIG. 3, the ejector 8a, which is not required to perform any substantial cutting action, can be made of a relatively soft corrosion resistant metal, or, can be made of a hard synthetic plastics material. To further reduce the force required in ejection of the bridges 9, the bridges, as illustrated in FIG. 6a, can be reduced in width in the punching operation by nicks or cuts 10 which are effected simultaneously with the punching of the slots. Alternatively, or additionally, the bridges can be reduced in thickness by a nick or cut 10 in the upper face thereof as shown in FIG. 6b, which again is effected during the punching of the slots. Preferably the bridges are made of a width in the range of about 1 to 3 cm. As will be appreciated, the width of the bridges and the number thereof may be changed as desired, it being preferable that at least one bridge is provided on each of the sides of the plate. This, however, is not essential. Optionally, and as is illustrated in FIG. 7, bridges 9 may be provided on one side of the plate only, in which event the plate can be freed from the stock strip material by a rotary cutter or a shearing knife, thus eliminating the necessity of accurately positioning an ejector mechanism in a direction laterally of the stock strip material.

In order to avoid the loss of corrosive paste by its being filled into the punched out slots, with consequent wastage of the corrosive paste, the plate blank can be formed as illustrated in FIG. 8 by a plurality of cut lines 1a' having ends which are spaced from the ends of the adjacent lines to provide bridges 9 at the adjacent ends of respective pairs of cut lines.

In this embodiment, the cut lines preferable are formed by a cutting die 21 having a male die 21a and a cooperating female die 21b, the male die having a slanted bottom end surface. The male die, in cutting the lines L displaces the material of the stock strip material downwardly against a spring biased platen 22, which is operative to return the displaced stock strip material back to a position in which it is coplanar with the stock strip material as the male die 21a is retracted.

In order to facilitate the formation of the cut lines, it is preferable to make an advance a pair of small holes 1'1' on the opposite sides of the bridge 9, this conveniently can be done at the time the grid of openings 2 are formed in the stock strip material.

In the embodiment of FIG. 8, in addition to being held by the bridges 9, the plate blank also is supported at it periphery by the edges of the stock strip material in a manner similar to that described with reference to FIG. 2b, as a consequence of which the bridges 9 can be made only minor width.

Referring now to FIG. 10, there is illustrated a pair of plate blanks which are formed simultaneously in the stock strip material in the manner described above with reference to FIG. 4 by a means for forming which is included in the press. In FIG. 10, the respective plates are arranged substantially in a butting relationship with each other, and, are interconnected by either a single bridge 9 as illustrated, or by one or more bridges. In FIG. 10, the pairs of plates are formed for them to extend longitudinally of the stock strip material. Alternatively, and as is illustrated in FIG. 13, the respective pairs of plates can be formed for them to extend transversely of the stock strip material.

Referring now to FIG. 11, which is a fragmentary cross-section on the line XI—XI of FIG. 10, each plate of the pair of plates is formed at its periphery for it to be of channel section, in order that the effective thickness of the respective plates is increased, alternatively, as is shown in FIG. 12, the edges of the plates can be bent in the absence of such a groove, thus eliminating unnecessary filling of the groove with the corrosive paste.

Referring now to FIG. 14, there is shown a complete apparatus for the continuous production of battery plates according to the present invention. In FIG. 14, stock strip material 1 is fed from a storage coil 20 thereof to a press 11 in which the respective punching operations are performed sequentially as the stock strip material is indexed through the press. At 12 there is indicated any convenient form of indexing mechanism, the indexing mechanism preferably being one which has indexing pins which are received in the perforations at the lateral sides of the stock strip material in order to ensure accurate positioning of the stock strip material as it is sequentially indexed through the press 11.

On leaving the press 11, the stock strip material preferably passes through a known apparatus for converting the intermittent travel of the stock strip material into a continuous travel thereof prior to the stock strip material being fed through a filling mechanism 14.

Optionally, prior to the stock strip material entering the filling mechanism 14, it is passed through the pinch of a pair of rolls 19 which return the stock strip material to its planar condition, thus eliminating any irregularaties on the surface of the stock material caused by the punching operations. On leaving the filling mechanism 14, the stock strip material is passed through a heating apparatus in which the corrosive paste material is dried, subsequent to which the stock strip material is passed through an ejector mechanism 16, at which point the finished plates are removed from the stock strip material, the scrap stock strip material then being fed by driven rollers 15 to a scrap cutter 17.

Optionally, apparatus for spraying water of dilute sulfuric acid can be incorporated into the apparatus at the position where the stock strip material enters the filling mechanism 14. Additionally, a compacting apparatus can be interposed between the filling mechanism 14 and the heating apparatus 18 for compacting the corrosive paste applied to the successive plates.

In operation the stock strip material progressively is fed to the punch 11, where the respective grid openings and plate blanks are sequentially cut in the strip, subsequent to which the strip is fed in a continuous manner through the filling mechanism 14, at which point the openings of the grids are filled with the corrosive paste material. On leaving the filling mechanism 14, the strip passes through the drying apparatus 18, and, on emerging from that apparatus, passes through the ejector mechanism 16, at which point the finished plates are ejected or removed from the stock strip material.

While preferred embodiments of the invention have been described, it will be appreciated that various modifications may be made without departing from the scope of the appended claims.

What is claimed is:

1. Apparatus for use in the manufacture of plates of an electrical storage battery in a continuous operation, comprising:

a punch press for punching grids of openings in a continuous strip of stock material and for partially severing plates from said stock strip material around the periphery of said plates to define the perimeter of said plates while leaving relatively weak and easily rupturable bridges interconnecting said plates with surrounding stock strip material, said press including means for form finishing said plates simultaneously with the partial severing and cutting die means for the partial severing;

a filling mechanism operative to fill corrosive paste material into the openings of said grids;

an ejector mechanism for removing said plates from said surrounding stock strip material by rupturing said bridges; and a drive mechanism for feeding said stock material from a source thereof sequentially through said punch press, said filling mechanism, and said ejector mechanism.

2. Apparatus according to claim 1, further including drying means interposed between said filling mechanism and said ejector mechanism, and through which said stock strip material passes on leaving said filling mechanism.

3. Apparatus according to claim 1, in which said punch press is a multiple head press in which a first press head punches sequential arrays of grid openings in said stock strip material, and a second press head having said cutting die means partially cutting the periphery of the respective plates in time sequence with said first punch head, and including an indexing mechanism for sequentially indexing said stock strip material through said multiple head press in timed sequence with said punching and severing operations.

4. Apparatus according to claim 3, further including means for converting intermittent longitudinal movement of said stock strip material as it leaves the punch press into a constant velocity linear movement of the strip prior to said strip entering said filling mechanism.

5. In a process for the manufacture of plates of an electrical storage battery which includes the steps of punching a grid of openings in stock strip material, filling said openings with a corrosive paste material, and subsequently punching said battery plates out of said stock strip material, the improvement comprising:

partially severing said stock strip material at positions defining the perimeter of said plates along frame-shaped cut lines each comprising a plurality of longitudinally spaced cut lines which define said perimeter while simultaneously form finishing said plates, the adjacent ends of the respective cut lines being spaced from each other by a distance defining relatively weak and easily rupturable bridges interconnecting said plate with said stock strip material, said bridges supporting said plate within said stock strip material to form a plurality of plate blanks each defined by a frame-shape cut line and connected through the bridges to the stock strip material surrounding the perimeter of each plate blank;

subsequently filling said openings with said corrosive paste material, each plate blank being supported through the bridges by the surrounding stock strip material; and subsequently ejecting said plates from the surrounding stock strip material by rupturing said bridges.

6. The process of according to claim 5, including the step of partially severing said stock strip material at positions simultaneously defining the perimeter of a plurality of said plates in a manner leaving such plate supported by but readily detachable from said strip and from each adjacent plate in said group.

7. The process according to claim 5, in which each bridge is further weakened by reducing its thickness at a location intermediate said plate and said stock strip material.

8. The process according to claim 5, in which each bridge is further weakened by reducing its width at a location intermediate to said plate and said stock strip material.

* * * * *